(12) United States Patent
Lu et al.

(10) Patent No.: US 10,385,550 B2
(45) Date of Patent: Aug. 20, 2019

(54) STEAM COOKER AND BACKFLOW PREVENTION DEVICE THEREOF

(71) Applicant: Ningbo Lvzhipin Electrical Appliance Science and Technology CO., LTD., Ningbo (CN)

(72) Inventors: Dingyao Lu, Ningbo (CN); Shuqing Xu, Ningbo (CN); Chao Yuan, Ningbo (CN)

(73) Assignee: NINGBO LVZHIPIN ELECTRICAL APPLIANCE SCIENCE AND TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 15/961,876

(22) Filed: Apr. 25, 2018

(65) Prior Publication Data

US 2019/0194914 A1   Jun. 27, 2019

(30) Foreign Application Priority Data

Dec. 26, 2017   (CN) .......................... 2017 1 1432190

(51) Int. Cl.
*E03B 7/07*       (2006.01)
*A47J 27/092*  (2006.01)
*A47J 27/04*    (2006.01)
*E03C 1/10*     (2006.01)
*F16K 15/00*   (2006.01)

(52) U.S. Cl.
CPC ............. *E03B 7/077* (2013.01); *A47J 27/092* (2013.01); *A47J 27/04* (2013.01); *E03C 1/106* (2013.01); *F16K 15/00* (2013.01)

(58) Field of Classification Search
CPC ... A47J 27/09; A47J 27/092; Y10T 137/3185; E03B 7/077; F16L 37/28
USPC ................. 99/410, 417; 126/21 A; 219/401; 137/358, 540; 251/149.6
See application file for complete search history.

(56) References Cited

U.S. PATENT DOCUMENTS

| | | | | |
|---|---|---|---|---|
| 1,510,967 A | * | 10/1924 | Smolensky | F16K 15/063 137/533.29 |
| 2,051,100 A | * | 8/1936 | Nelson | A47J 27/09 137/523 |
| 2,097,585 A | * | 11/1937 | Carson | A47J 27/09 137/197 |
| 2,635,630 A | * | 4/1953 | Cornelius | A47J 27/09 116/272 |
| 2,682,279 A | * | 6/1954 | Wyman | A47J 27/09 137/470 |

(Continued)

*Primary Examiner* — Eric Keasel
*Assistant Examiner* — Kevin R Barss

(57) ABSTRACT

The present disclosure provides a backflow prevention device includes an upper chassis, a lower chassis, a seal member, and a resilient member. The upper chassis defines a receiving space passing through a bottom of the upper chassis. The lower chassis defines an air flow channel. A part of the lower chassis is accommodated in the receiving space of the upper chassis, and fixedly connected to an inner wall of the upper chassis. The upper chassis and the lower chassis are mounted to a pot. The seal member is received in the receiving space. The resilient member is resiliently mounted between the seal member and the upper chassis. The resilient power of the resilient member pushes the seal member to resist against and seal the air flow channel.

7 Claims, 3 Drawing Sheets

(56) References Cited

U.S. PATENT DOCUMENTS

| | | | | |
|---|---|---|---|---|
| 2,963,041 | A | * | 12/1960 | Vischer, Jr. .............. A47J 27/09 |
| | | | | 137/541 |
| 3,645,418 | A | * | 2/1972 | Oberlander ........... A47J 27/092 |
| | | | | 220/203.12 |
| 4,370,999 | A | * | 2/1983 | Sebillotte ................ A47J 27/09 |
| | | | | 137/270 |
| 4,424,915 | A | * | 1/1984 | Horn ..................... A47J 27/092 |
| | | | | 220/203.27 |
| 6,009,902 | A | * | 1/2000 | Troiani ................... F16L 37/28 |
| | | | | 137/614.11 |
| 8,848,162 | B2 | * | 9/2014 | Mulkens ............. G03F 7/70341 |
| | | | | 355/30 |
| 2003/0116578 | A1 | * | 6/2003 | Wooderson ......... A47J 27/0813 |
| | | | | 220/756 |

* cited by examiner

STEAM COOKER AND BACKFLOW PREVENTION DEVICE THEREOF

CROSS-REFERENCE TO RELATED APPLICATIONS

This application claims all benefits accruing under 35 U.S.C. § 119 from China Patent Application No. 201711432190.4, filed on Dec. 26, 2017 in the State Intellectual Property Office of China, the content of which is hereby incorporated by reference.

TECHNICAL FIELD

The present disclosure relates to the graphene materials technology, and particularly to a graphene composite powder form material and method for making the same.

BACKGROUND

A steam cooker is a cookware which is used to cook foods via heat steam. The advantages of cooking with a steam cooker are no smoke, food that are not parched, resulting in foods that are healthier, more nutritious, and fresh. Generally, the steam cooker includes a main body, a pot mounted to the main body, a lid covered on the pot, and a backflow prevention device connecting the main body and the pot. The pot and the lid together form a cooking space for accommodating foods. In use, the main body heats water to form steam, which flows into the backflow prevention device and \into the pot to cook foods.

Generally, the backflow prevention device usually includes a seal member. In use, the steam pushes the seal member to move upwards to open the backflow prevention device, and then the steam flows into the pot from the main body. After use, the pot is moved out, and the seal member moves downward under its weight to seal the backflow prevention device. As such the main body and the pot are separated to prevent the liquid in the pot from diffusing outside when the pot is moved out.

However, the seal member depends on its weight to seal the backflow prevention device, which is unreliable, so that the liquid in the pot can diffuse out when the pot is drawn up.

SUMMARY

A backflow prevention device can include an upper chassis, a lower chassis, a seal member, and a resilient member. The upper chassis can define a receiving space passing through a bottom of the upper chassis. The lower chassis can define an air flow channel Part of the lower chassis can be accommodated in the receiving space of the upper chassis, and fixedly connected to an inner wall of the upper chassis. The upper chassis and the lower chassis can be mounted to a pot, and the seal member can be received in the receiving space. The resilient member can be resiliently mounted between the seal member and the upper chassis, and the resilient or elastic force of the resilient member can push the seal member to resist against and seal the air flow channel.

Furthermore, the backflow prevention device can include a nozzle fixed to the main body, and configured to be inserted into the air flow channel to push the seal member to move upwards.

The nozzle can define a cross groove.

The backflow prevention device can further include a first seal ring mounted in the air flow channel and resisting against the outer wall of the nozzle.

The first seal ring can be substantially V-shaped, and include an upright outer lip and an inner lip slantly extending upward from the inner wall of the outer lip, and the inner lip can resist fixedly against the outer wall of the nozzle.

The lower chassis can define a mounting groove for fixing the first seal ring.

The seal member can include a guide post and a seal lid extending from a circumferential surface of the guide post. A part of the guide post can be fixed in the air flow channel, and two ends of the resilient member can respectively resist against the seal lid and the upper chassis. The resilient force of the resilient member can push the seal lid to resist against and seal the air flow channel.

The resilient member can be a spring fixed to the other part of the guide post.

The upper chassis and the lower chassis can be fixed by a threaded engagement.

A steam cooker can include a main body, a pot, and the backflow prevention device, which is connected to the main body and the pot.

The resilient member can be resiliently mounted between the seal member and the upper chassis, and the resilient or elastic force of the resilient member pushing the seal member to resist against and seal the air flow channel of the lower chassis. When the pot is moved out of the main body, the seal member can move downwards to seal the air flow channel by the resilient or elastic force of the resilient member. As such, the air flow channel and the receiving space are separated by the seal member. The seal member can seal fixedly and reliably to prevent the liquid in the pot diffusing outside when the pot is moved out of the main body.

DETAILED DESCRIPTION

Figure 1:
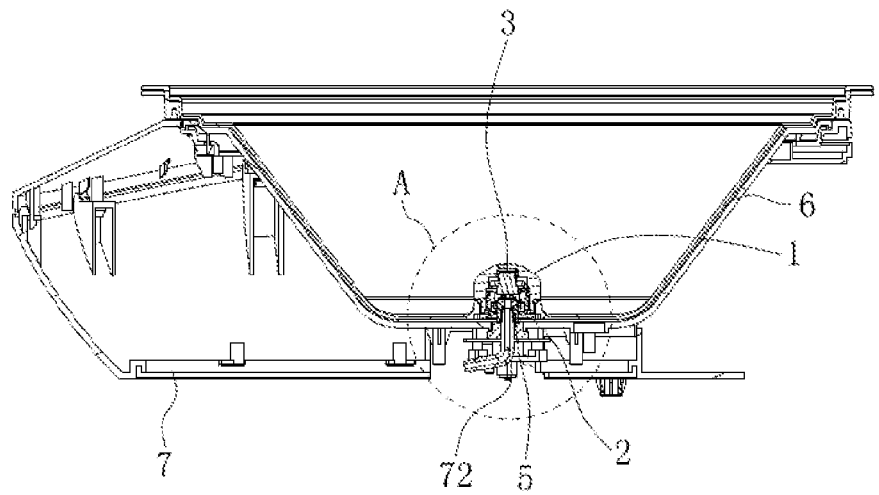
FIG. 1 is a cross section view of an embodiment of a steam cooker, the steam cooker including a pot and a nozzle.
Figure 2:
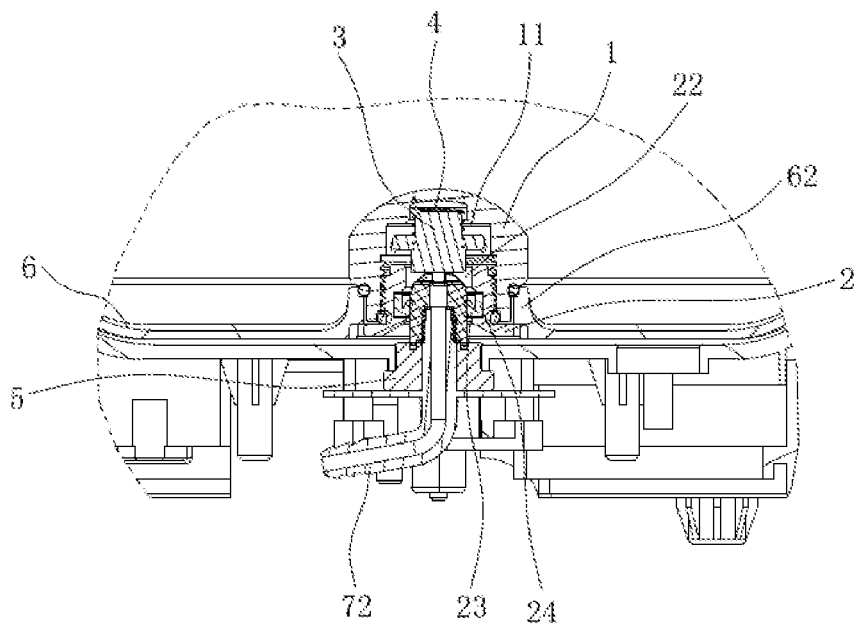
FIG. 2 is an enlarged view of the circle A of the FIG. 1.
Figure 3:
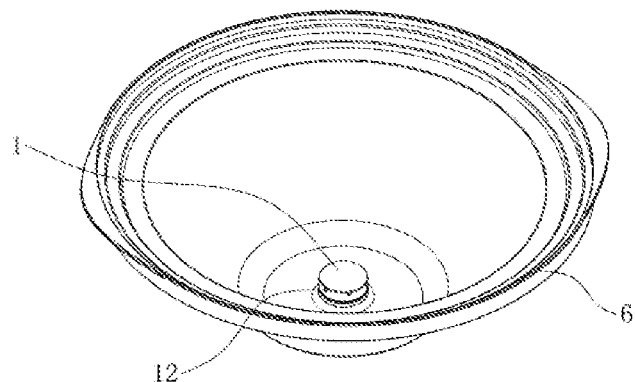
FIG. 3 is an isometric schematic view of the pot of FIG. 1.
Figure 4:
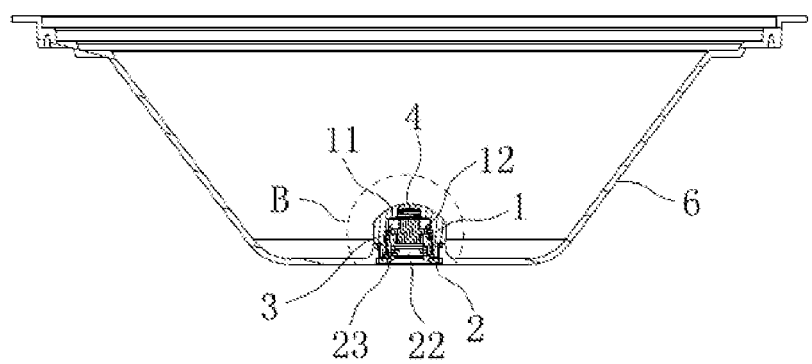
FIG. 4 is a cross section view of FIG. 3.
Figure 5:
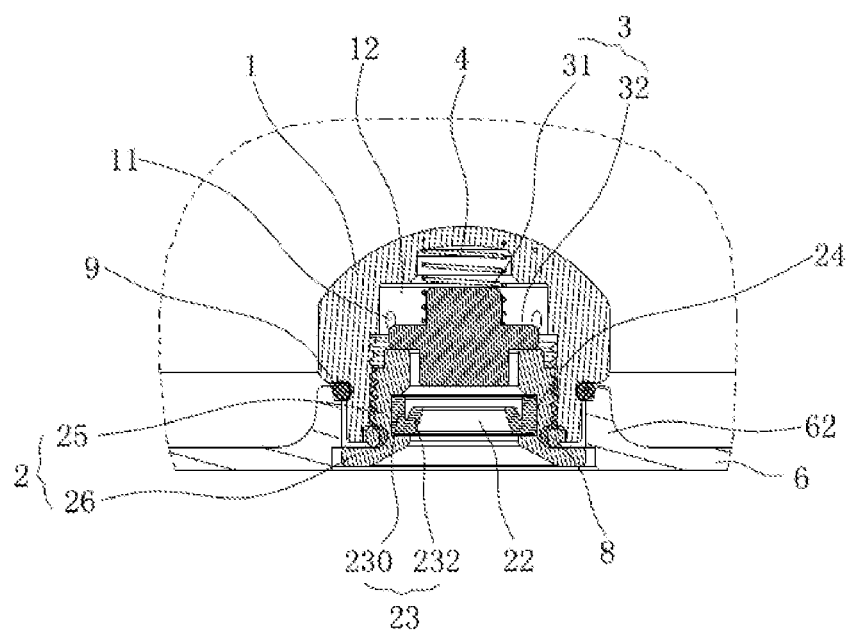
FIG. 5 is an enlarge view of the circle B of the FIG. 4.

The disclosure is illustrated by way of example and not by way of limitation in the figures of the accompanying drawings in which like references indicate similar elements.

Referring to FIGS. 1 through 5, an embodiment of a backflow prevention device includes an upper chassis 1, a lower chassis 2, a seal member 3, and a resilient member 4. The upper chassis 1 defines a receiving space 11 passing through a bottom of the upper chassis 1. The lower chassis 2 defines an air flow channel 22. A part of the lower chassis 2 is accommodated in the receiving space 11 of the upper chassis 1, and fixedly connected to an inner wall of the upper chassis 1. The upper chassis 1 and the lower chassis 2 are mounted to a pot 6. The seal member 3 is received in the receiving space 11. The resilient member 4 is resiliently mounted between the seal member 3 and the upper chassis 1, and the resilient force of the resilient member 4 pushes the seal member 3 to resist against and seal the air flow channel 22. The top portion of the upper chassis 1 defines some air vents 12, by which the steam in the receiving space 11 can flow into the pot 6.

In use of the backflow prevention device, the upper chassis 1 and the lower chassis 2 are both mounted to the pot 6 located in a main body 7 of the steam cooker. The steam generating from the main body 7 or a nozzle 5 fixed to the main body 7 can push the seal member 3 to move upward to open the air flow channel 22, after which, the air flow channel 22 and the receiving space 11 communicate to each other. After then, the steam generating from the main body 7 flows into the air flow channel 22 via the nozzle 5, and then jets into the pot 6 to cook foods received in the pot, via the air vents 12 of the upper chassis 1. After finishing cooking, the pot 6 is moved out from the main body 7, the seal member 3 moves downward to seal the air flow channel 22 by the resilient force of the resilient member 4. As such the air flow channel 22 and the receiving space 11 are separated by the seal member 3. The seal member 3 is sealed fixedly and reliably to prevent the liquid in the pot 6 from diffusing outside when the pot 6 is moved out of the main body 7.

The backflow prevention device can also include the nozzle 5 fixed to the main body 7. The nozzle 5 can be inserted into the air flow channel 22 to push the seal member 3 to move upward, so that the air flow channel 22 and the receiving space 11 can communicate to each other. Hence, the seal member 3 can move upward without depending on the steam generated from the main body 7, to avoid the risk of leaking caused by the increasing steam pressure in the steam cooker for pushing the seal member 3 to move upward. In addition, it can also avoid noise as the steam pushes the seal member 3 to move upward.

Figure 6:
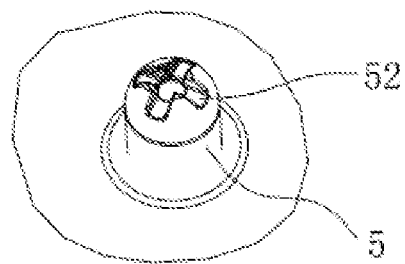
FIG. 6 is an isometric schematic view of the nozzle of FIG. 1.

Referring to FIG. 6, in this embodiment, the nozzle 5 defines a cross groove 52. When the seal member 3 is pushed to move upward, the steam can smoothly flow out from the groove 52, so that the nozzle 5 cannot be sealed by the seal member 3.

In one embodiment, the backflow prevention device further includes a first seal ring 23 mounted in the air flow channel 22. The inner wall of first seal ring 23 resists against the outer wall of the nozzle 5, for preventing the steam from leaking outside from an aperture between the nozzle 5 and the inner wall of the air flow channel.

In one embodiment, the first seal ring 23 is substantially V-shaped, and includes an upright outer lip 230 and an inner lip 232 slantly extending upward from the inner wall of the outer lip 230. In other words, the first seal ring 23 forms a through hole, and the through hole has a smaller sized upper part and a larger sized lower part. When the nozzle 5 passes through the first seal ring 23, the inner lip 232 is resisted to deform, which can enlarge the diameter of the through hole, after which, it is convenient to pass the nozzle 5 through the hole. At the same time, the first seal ring 23 can be deformed to force the inner wall thereof to resist fixedly against the outer wall of the nozzle 5, for preventing the steam from flowing back. Furthermore, the inner wall of the lower chassis 2 can define a mounting groove 24 for fixing the first seal ring 23, and the inner wall of the lower chassis 2 is around the air flow channel 22.

In one embodiment, the seal member 3 includes a guide post 31 and a seal lid 32 extending from a circumferential surface of the guide post 31. A part of the guide post 31 is fixed in the air flow channel 22, and two ends of the resilient member 4 respectively resist against the seal lid 32 and an inner surface of the top wall of the upper chassis 1. The resilient force of the resilient member 4 pushes the seal lid 32 to resist against and seal the air flow channel 22. The guide post 31 can guide the seal member 3 to move along the axes of the air flow channel 22, and the nozzle 5 easily pushes the seal member 3 to move upward because of the guide post 31 being fixed in the air flow channel 22.

In one embodiment, the resilient member 4 is a spring fixed to the other part of the guide post 31. In other words, the seal lid 32 divides the guide post 31 into an upper part and a lower part. The lower part of the guide post 31 is fixed in the air flow channel 22 for guiding the seal member 3 to move along the axes of the air flow channel 22. The spring sleeves on the upper part of the guide post 31 to avoid shifting.

In one embodiment, the upper chassis 1 and the lower chassis 2 are fixed by a threaded engagement, so that the upper chassis 1 and the lower chassis 2 can be conveniently detached from each other for repairing and maintenance.

In one embodiment, the lower chassis 2 further includes a main chassis 25 and a connecting part 26 extending from a bottom of the main chassis 25. The main chassis 25 is accommodated in the receiving space 11 of the upper chassis 1, and fixed to the inner wall of the upper chassis 1 via screw thread thereof. The air flow channel 22 passes through the main chassis 25 and the connecting part 26. The connecting part 26 can be substantially trumpet-shaped so that the nozzle 5 can be fixed to the upper chassis 1 through the connecting part 26. Furthermore, there can be a second seal member 8, fixed and sealing the inner surface of the bottom of the upper chassis 1 and an outer wall of the main chassis 25 of the lower chassis 2 for avoiding leaks.

Another embodiment of a steam cooker includes a main body 7, a pot 6, and the backflow prevention device connecting the main body 7 and the pot 6. The upper chassis 1, the lower chassis 2, and the pot 6 mount together. The bottom of the pot 6 defines, an air hole 62 which can be a bulge located on the bottom of the pot 6. The upper chassis 1 covers the air hole 62 and extends into the air hole 62, with the lower chassis 2 located in and connected to the air hole 62. Additionally, there can be a third seal member 9, fixed and sealing between the upper chassis 1 and the air hole 62 to prevent leaking from the pot 6. The nozzle 5 is fixed to the main body 7 and connected to the inlet tube 72 of the main body 7. The inlet tube 72 can be connected to a heating device in the main body 7.

In use of the steam cooker, the pot 6 can be located in the main body 7 of the steam cooker. The nozzle 5 can be inserted into the air flow channel 22 to push the seal member 3 to move upward, after which the air flow channel 22 and the receiving space 11 can communicate to each other. After then, the steam generated from the main body 7 flows into the receiving space 11 from the nozzle 5 and the air flow channel 22 one by one, and then jets into the pot 6 to cook foods received in the pot 6. After the cooking is finished, the pot 6 is moved out from the main body 7, the seal member 3 moves downwards to seal the air flow channel 22 by the resilient force of the resilient member 4. As such the air flow channel 22 and the receiving space 11 are separated by the seal member 3. Because the seal member 3 can seal fixedly and reliably to prevent the liquid in the pot 6 diffusing outside when the pot 6 is moved out of the main body 7.

In one embodiment, the resilient member 4 is resiliently mounted between the seal member 3 and the upper chassis 1, and the resilient force of the resilient member 4 pushes the seal member 3 to resist against and seal the air flow channel 22 of the lower chassis 2. When the pot 6 is moved out of the main body 7, the seal member 3 moves downward to seal the air flow channel 22 by the resilient force of the resilient member 4. As such the air flow channel 22 and the receiving space 11 are separated by the seal member 3. The seal member 3 can seal fixedly and reliably to prevent the liquid in the pot 6 diffusing outside when the pot 6 is moved out of the main body 7.

The above embodiments are only illustrated to help understanding the method and the essential idea of the present disclosure. One of ordinary skill in the art can make other variations in the spirit of the present disclosure, these variations based upon the spirit of the present disclosure are all included in the claimed protect scope of the present disclosure. The above descriptions are only preferred embodiments, thus cannot limit the claim scope of the application. All the equivalent modifications and variations made by one of ordinary skill in the art based on the spirit of the present disclosure are belonged to the claim scope of the application.

What is claimed is:

1. A backflow prevention device comprises an upper chassis, a lower chassis, a seal member, and a resilient member, wherein the upper chassis defines a receiving space passing through a bottom of the upper chassis, the lower chassis defines an air flow channel, a part of the lower chassis is accommodated in the receiving space of the upper chassis, and fixedly connected to an inner wall of the upper chassis, the upper chassis and the lower chassis are mounted to a pot, and the seal member is received in the receiving space, the resilient member is resiliently mounted between the seal member and the upper chassis, and a resilient power of the resilient member pushes the seal member to resist against and seal the air flow channel, wherein the backflow prevention device further comprises a nozzle fixed to a main body and configured to be inserted into the air flow channel to push the seal member to move upwards, and the nozzle defines a cross groove.

2. The backflow prevention device of claim 1, further comprising a first seal ring mounted in the air flow channel and abutting the outer wall of the nozzle.

3. The backflow prevention device of claim 2, wherein the first seal ring is substantially V-shaped, and comprises an upright outer lip and an inner lip slantly extending upward from the inner wall of the outer lip, and the inner lip resists fixedly against the outer wall of the nozzle.

4. The backflow prevention device of claim 3, wherein the lower chassis defines a mounting groove for fixing the first seal ring.

5. The backflow prevention device of claim 1, wherein the seal member comprises a guide post and a seal lid extending from a circumferential surface of the guide post, a part of the guide post is fixed in the air flow channel, two ends of the resilient member respectively resist against the seal lid and the upper chassis, and the resilient force of the resilient member pushes the seal lid to resist against and seal the air flow channel.

6. The backflow prevention device of claim 5, wherein the resilient member is a spring fixed to another part of the guide post.

7. The backflow prevention device of claim 1, wherein the upper chassis and the lower chassis are fixed by a threaded engagement.

\* \* \* \* \*